US012509136B2

(12) United States Patent
Hong et al.

(10) Patent No.: US 12,509,136 B2
(45) Date of Patent: Dec. 30, 2025

(54) STEERING APPARATUS FOR VEHICLE

(71) Applicant: NAMYANG NEXMO Co., Ltd, Ansan-si (KR)

(72) Inventors: Jin Yong Hong, Ansan-si (KR); Hyeong Joo Lee, Seoul (KR); Kyung Hwan Moon, Siheung-si (KR)

(73) Assignee: NAMYANG NEXMO CO., LTD, Ansan-si (KR)

( * ) Notice: Subject to any disclaimer, the term of this patent is extended or adjusted under 35 U.S.C. 154(b) by 0 days.

(21) Appl. No.: 18/917,532

(22) Filed: Oct. 16, 2024

(65) Prior Publication Data

US 2025/0033688 A1   Jan. 30, 2025

Related U.S. Application Data

(63) Continuation of application No. PCT/KR2022/019050, filed on Nov. 29, 2022.

(30) Foreign Application Priority Data

May 17, 2022  (KR) .................. 10-2022-0060223

(51) Int. Cl.
*B62D 1/187*   (2006.01)
*B62D 1/184*   (2006.01)
*B62D 1/185*   (2006.01)

(52) U.S. Cl.
CPC ............. *B62D 1/187* (2013.01); *B62D 1/184* (2013.01); *B62D 1/185* (2013.01)

(58) Field of Classification Search
CPC ......... B62D 1/184; B62D 1/185; B62D 1/187
See application file for complete search history.

(56) References Cited

U.S. PATENT DOCUMENTS 7,752,940 B2   7/2010 Lutz
8,661,930 B2 *  3/2014 Okada ................... B62D 1/187
                                         280/775

(Continued)

FOREIGN PATENT DOCUMENTS

JP        2017-019339 A    1/2017
KR       10-1593592 B1    2/2016
(Continued)

OTHER PUBLICATIONS

International Search Report for PCT/KR2022/019050 mailed Feb. 28, 2023 from Korean Intellectual Property Office.
(Continued)

*Primary Examiner* — Laura Freedman
(74) *Attorney, Agent, or Firm* — Paratus Law Group, PLLC

(57) ABSTRACT

In accordance with an embodiment of a steering apparatus for a vehicle, two opposite ends of a coupling shaft part of a fixed gear are integrated with the fixed gear, an intervening portion between the two opposite ends is disposed so that a separation hole is formed between a body of the fixed gear and the intervening portion, and a coupling rotation part of a moving gear is integrated with the moving gear and caught by and fitted and coupled to the coupling shaft part through the separation hole, which improves strength and hardness of the fixed gear and improve coupling strength between the fixed gear and the coupling shaft part.

8 Claims, 9 Drawing Sheets

(56) References Cited

U.S. PATENT DOCUMENTS 9,162,700 B2 * 10/2015 Tinnin .................... B62D 1/184
9,604,663 B2 * 3/2017 Tomiyama ............. B62D 1/184
9,845,104 B2 * 12/2017 Hong ..................... B62D 1/187

FOREIGN PATENT DOCUMENTS

| KR | 10-1648503 B1 | 8/2016 |
| KR | 10-2079641 B1 | 2/2020 |
| KR | 10-2020-0097935 A | 8/2020 |

OTHER PUBLICATIONS

German Office Action for related DE Application No. 112022006783.7 mailed Apr. 11, 2025 from German Patent and Trade Mark Office.

* cited by examiner

STEERING APPARATUS FOR VEHICLE

CROSS-REFERENCE TO PRIOR APPLICATIONS

This application is a Continuation Application of PCT International Application No. PCT/KR2022/019050 (filed on Nov. 29, 2022), which claims priority to Korean Patent Application No. 10-2022-0060223 (filed on May 17, 2022), which are all hereby incorporated by reference in their entirety.

BACKGROUND

The present invention relates to a steering apparatus for a vehicle, and more particularly, to a steering apparatus for a vehicle that has a telescope function.

In general, a steering apparatus for a vehicle refers to an apparatus capable of changing a traveling direction of a vehicle in accordance with a driver's intention. The steering apparatus for a vehicle includes a steering shaft configured to be rotatable in a circumferential direction, a steering wheel coupled to an upper end of the steering shaft and serving as a part that the driver grips with the hand, and a steering column configured to surround an outer circumference of the steering shaft.

When the driver grips the steering wheel with the hand and rotates the steering wheel, the steering shaft is rotated in a rotation direction of the steering wheel. Therefore, left and right tie rods are moved in an axial direction by a steering gear, which operates in conjunction with the steering shaft, and rotate knuckles installed on left and right vehicle wheels, such that the vehicle wheels of the vehicle are steered so that tips of the vehicle wheels are directed leftward or rightward.

Meanwhile, the steering apparatus for a vehicle has tilt and telescope functions in order to adjust a position of the steering wheel in accordance with a body condition of the driver (e.g., a sitting height or a length of the arm).

The tilt function is a function of adjusting the position of the steering wheel by adjusting a gradient of the steering column.

In addition, in the case of the telescope function, the steering column includes an inner tube and a column housing, the inner tube surrounds an outer circumference of the steering shaft, and the inner tube is inserted into the column housing, such that the inner tube is configured to move in the axial direction relative to the column housing together with the steering shaft while surrounding the outer circumference of the steering shaft, thereby adjusting the position of the steering wheel in the axial direction. The telescope function also serves to absorb impact energy as the steering wheel and the steering column are collapsed in the event of a collision of the vehicle.

The steering apparatus for a vehicle has an operating lever configured to allow the driver to manipulate the position of the steering wheel in accordance with the body condition of the driver by using the tilt function or the telescope function. That is, the driver may use the tilt function or the telescope function after unlocking the operating lever by rotating the operating lever. After using the tilt function or the telescope function, the driver may fix the position of the steering wheel by locking the operating lever again by rotating the operating lever to an original position.

Korean Patent No. 10-2053708 (Dec. 9, 2019) (hereinafter, referred to as 'the related art') discloses 'DEVICE FOR TILTING STEERING COLUMN'.

In the related art, the device includes a tilt shaft configured to penetrate a tilt bracket, the operating lever coupled to one end of the tilt shaft, and a fixing force maintaining means coupled to the other end of the tilt shaft and configured to enable or disable a tilting operation of the tilt bracket.

In the related art, the fixing force maintaining means includes a fixing gear and a moving gear, and the moving gear is disposed to be rotatable about a rotary shaft, which is provided on the fixing gear, and disposed to be movable along the rotary shaft.

However, in the related art, the fixing gear and the moving gear are manufactured by a die-casting process and thus have low strength and hardness, which causes a problem in that gear teeth are deformed when the fixing gear and the moving gear are used over a long period of time. In addition, because of a structure in which the rotary shaft provided on the fixing gear is manufactured separately from the fixing gear and then assembled to the fixing gear, there is also a problem in that coupling strength between the fixing gear and the rotary shaft is low, and the fixing gear and the rotary shaft are deformed by an external axial force.

SUMMARY

A technical object of the present invention is to provide a steering apparatus for a vehicle, in which strength and hardness of at least one of a fixed gear and a moving gear, which constitute a tilt adjustment device, are improved.

Another technical object of the present invention is to provide a steering apparatus for a vehicle, in which a coupling shaft part, which is provided on the fixed gear so that a moving gear is rotatably coupled to the coupling shaft part, is integrated with the fixed gear during a process of forming the fixed gear, such that coupling strength between the fixed gear and the coupling shaft part is improved.

The technical problems of the present invention are not limited to the aforementioned technical problem, and other technical problems, which are not mentioned above, may be clearly understood by those skilled in the art from the following descriptions.

In order to achieve the above-mentioned object, a steering apparatus for a vehicle according to the present invention includes a tilt shaft, a fixed gear, and a moving gear. The tilt shaft penetrates two opposite sides of a column housing. A tilt lever is coupled to one end of the tilt shaft. The fixed gear is fixed to one side of the two opposite sides of the column housing that is disposed to be distant from the tilt lever. The other end of the tilt shaft penetrates the fixed gear. A coupling shaft part is formed at one end of the fixed gear. The other end of the tilt shaft penetrates the moving gear. A coupling rotation part is formed at one end of the moving gear. The coupling rotation part may be rotatably coupled to the coupling shaft part and movable along a length of the coupling shaft part. During a rotational operation of the tilt lever, the moving gear engages with or disengages from the fixed gear by being rotated about the coupling shaft part as a rotation center by a movement of the tilt shaft in an axial direction. Two opposite ends of the coupling shaft part of the fixed gear are integrated with the fixed gear, and an intervening portion between the two opposite ends is disposed so that a separation hole is formed between a body of the fixed gear and the intervening portion. The coupling rotation part of the moving gear is integrated with the moving gear and caught by and fitted and coupled to the coupling shaft part through the separation hole.

The fixed gear may be formed by sintering. The coupling shaft part may be integrated with the fixed gear by being formed by sintering together with the fixed gear when the fixed gear is formed by sintering.

The moving gear may be formed by sintering. The coupling rotation part may be integrated with the moving gear by being formed by sintering together with the moving gear when the moving gear is formed by sintering.

A plurality of gear teeth may be provided on a surface of the other end of the fixed gear and a surface of the other end of the moving gear that are opposite to each other. A side of the coupling rotation part, which is opposite to the surface of the moving gear on which the plurality of gear teeth is formed, may have an opening. The coupling rotation part may be rotatably coupled to the coupling shaft part through the opening.

The coupling shaft part may include a curved portion and a planar portion. The curved portion may be formed as a curved surface corresponding to an inner circumferential surface of the coupling rotation part and provided to be in contact with the inner circumferential surface of the coupling rotation part. The planar portion may be formed at a side opposite to the curved portion. The planar portion may be directed toward the opening in a state in which the moving gear engages with the fixed gear.

Depths and widths of troughs between the plurality of gear teeth formed on the fixed gear may gradually increase toward the coupling shaft part. The plurality of gear teeth formed on the moving gear may be shaped to engage with the troughs between the plurality of gear teeth formed on the fixed gear.

A first installation block part may be formed at one side of the column housing. An outer surface of the first installation block part may be formed as a flat surface. A second installation block part may be formed at the other side of the column housing. An outer surface of the second installation block part may be formed as a flat surface. The tilt shaft may penetrate the first installation block part and the second installation block part.

The steering apparatus for a vehicle of according to the present invention may further include a mounting bracket. The mounting bracket may have a first coupling plate part and a second coupling plate part. The first coupling plate part may be disposed on an outer surface of the first installation block part. The second coupling plate part may be disposed on an outer surface of the second installation block part. The tilt shaft may penetrate the first coupling plate part and the second coupling plate part. The fixed gear may be fixedly disposed outside the second coupling plate part.

The steering apparatus for a vehicle according to the present invention may further include a nut, a first washer, a second washer, and a needle roller cage. The nut may be coupled to the other end of the tilt shaft. The first washer may be disposed between the moving gear and the nut. The first washer may be in contact with the moving gear. The second washer may be disposed between the first washer and the nut. The second washer may be in contact with the nut. The needle roller cage may be disposed between the first washer and the second washer. Two opposite surfaces of the needle roller cage may be respectively in contact with the first washer and the second washer.

The steering apparatus for a vehicle according to the present invention may further include a bushing tube, an elastic member, and a movement block. The tilt shaft may penetrate the bushing tube. One end of the bushing tube may penetrate the fixed gear and support the moving gear in a direction in which the moving gear disengages from the fixed gear. The tilt shaft may penetrate the elastic member. The tilt shaft may penetrate the movement block. The other end of the bushing tube may be seated at one side of the movement block. One end of the elastic member may be seated at the other side of the movement block. The movement block may move the bushing tube by an elastic force of the elastic member in the direction in which the moving gear disengages from the fixed gear.

Other detailed matters of the embodiment are included in the detailed description and the drawings.

According to the steering apparatus for a vehicle according to the present invention, at least one of the fixed gear and the moving gear is formed by a sintering process, which may improve strength and hardness of at least one of the fixed gear and the moving gear.

In addition, according to the steering apparatus for a vehicle according to the present invention, the coupling shaft part, which is provided on the fixed gear so that the moving gear is rotatably coupled to the coupling shaft part, is formed together with the fixed gear by the sintering process during the process of forming the fixed gear, such that the coupling shaft part is integrated with the fixed gear, which may improve the coupling strength between the fixed gear and the coupling shaft part and prevent deformation caused by an external axial force.

The effects of the present invention are not limited to the aforementioned effects, and other effects, which are not mentioned above, will be clearly understood by those skilled in the art from the claims.

EXPLANATION OF REFERENCE NUMERALS AND SYMBOLS

Figure 1:
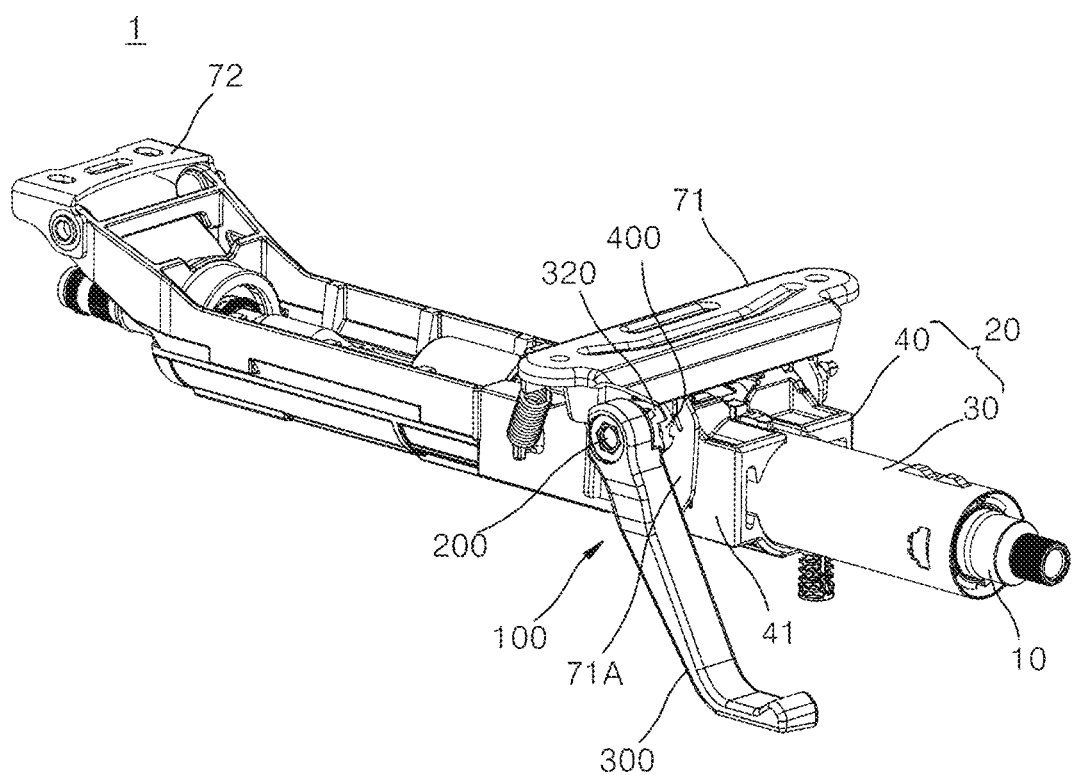
FIG. 1 is one side perspective view illustrating a steering apparatus for a vehicle according to an embodiment of the present invention.

1: Steering apparatus for vehicle
40: Column housing

71: Mounting bracket
71A: First coupling plate part
71B: Second coupling plate part
200: Tilt shaft
300: Tilt lever
500: Nut
600: Fixed gear
610: Coupling shaft part
611: Curved portion
612: Planar portion
620, 720: Gear tooth
640: Separation hole
700: Moving gear
710: Coupling rotation part
715: Opening
810: First washer
820: Second washer
830: Needle roller cage
910: Bushing tube
920: Elastic member
930: Movement block

DETAILED DESCRIPTION

Hereinafter, a steering apparatus for a vehicle according to an embodiment of the present invention will be described with reference to the drawings.

FIG. 1 is one side perspective view illustrating a steering apparatus for a vehicle according to an embodiment of the present invention.

With reference to FIG. 1, a steering apparatus 1 for a vehicle according to an embodiment of the present invention may include a steering shaft 10 and a steering column 20.

The steering shaft 10 may penetrate the steering column 20 in an axial direction. In this case, the axial direction may mean a longitudinal direction of the steering shaft 10. In the following description, the axial direction may mean a direction identical to the longitudinal direction of the steering shaft 10.

The steering column 20 may surround an outer circumference of the steering shaft 10. The steering column 20 may be installed on a vehicle body. The steering column 20 may support the steering shaft 10 so that the steering shaft 10 is rotatable.

The steering shaft 10 may be disposed to be rotatable in a circumferential direction. A steering wheel (not illustrated) may be coupled to one end of the steering shaft 10. In this case, the steering wheel may be disposed in the vicinity of an instrument panel positioned forward of a driver seat in an occupant compartment. A driver may grip the steering wheel with the hand to steer vehicle wheels of the vehicle. That is, while the vehicle travels, the driver may adjust a traveling direction of the vehicle leftward by gripping the steering wheel with the hand and rotating the steering wheel leftward or adjust the traveling direction of the vehicle rightward by gripping the steering wheel with the hand and rotating the steering wheel rightward.

The steering column 20 may include an inner tube 30 and a column housing 40.

The inner tube 30 may surround the outer circumference of the steering shaft 10. The steering shaft 10 may be disposed to be rotatable in the circumferential direction relative to the inner tube 30. A ball bearing may be installed between an outer circumferential surface of the steering shaft 10 and an inner circumferential surface of the inner tube 30, and the steering shaft 10 may be coupled to be rotatable in the circumferential direction relative to the inner tube 30 by means of the ball bearing. The inner tube 30, together with the steering shaft 10, may be disposed to be movable in the axial direction.

The steering shaft 10 may be divided into two parts including a first shaft and a second shaft. The first shaft may be formed in a tubular shape. One end of the second shaft may be inserted into and disposed in the first shaft, the other end of the second shaft may be disposed to protrude to the outside of the first shaft and rotatably coupled to the column housing 40 by means of the ball bearing, and the first shaft may be rotatably coupled to the inner tube 30 by means of the ball bearing. The inner tube 30 may move in the axial direction relative to the column housing 40. In this case, the first shaft, together with the inner tube 30, may move in the axial direction relative to the column housing 40.

The column housing 40 may surround an outer circumference of the inner tube 30. A part of the inner tube 30 may be inserted into the column housing 40 through one end of the column housing 40, and the remaining part of the inner tube 30 may be disposed to protrude to the outside of the column housing 40 through one end of the column housing 40. The inner tube 30 may penetrate the column housing 40 in the axial direction. The inner tube 30 may be installed in the column housing 40 and configured to be movable in the axial direction. The column housing 40 may support the inner tube 30 so that the inner tube 30 is movable in the axial direction.

The column housing 40 may be installed on the vehicle body. Mounting brackets 71 and 72 may be coupled to the column housing 40, and the column housing 40 may be installed on the vehicle body by means of the mounting brackets 71 and 72. The mounting brackets 71 and 72 may include a first mounting bracket 71 installed at an upper end of the column housing 40, and a second mounting bracket 72 installed at a lower end of the column housing 40.

A tilt adjustment device 100 may be installed on the column housing 40.

The tilt adjustment device 100 may include a tilt lever 300. The user may unlock the tilt lever 300 by rotating the tilt lever 300 toward one side and then adjust a gradient of the column housing 40 with respect to the mounting brackets 71 and 72 in accordance with a body condition of the driver.

The operation of adjusting the gradient of the column housing 40 with respect to the mounting brackets 71 and 72 may refer to the tilt adjustment. After the tilt adjustment, the user may lock the tilt lever 300 by rotating the tilt lever 300 toward the other side.

In addition, the user may unlock the tilt lever 300 by rotating the tilt lever 300 toward one side and spread the column housing 40 outward so that an inner circumferential surface of the column housing 40 is loosely attached to an outer circumferential surface of the inner tube 30, and then the user may adjust a length of the inner tube 30 with respect to the column housing 40 in accordance with the body condition of the driver.

The operation of adjusting the length of the inner tube 30 with respect to the column housing 40 may refer to the telescopic adjustment. After the telescopic adjustment, the user may lock the tilt lever 300 by rotating the tilt lever 300 toward the other side and retract the column housing 40 inward so that the inner circumferential surface of the column housing 40 is tightly attached to the outer circumferential surface of the inner tube 30, such that the inner tube 30 may not move in the axial direction relative to the column housing 40.

Figure 2:
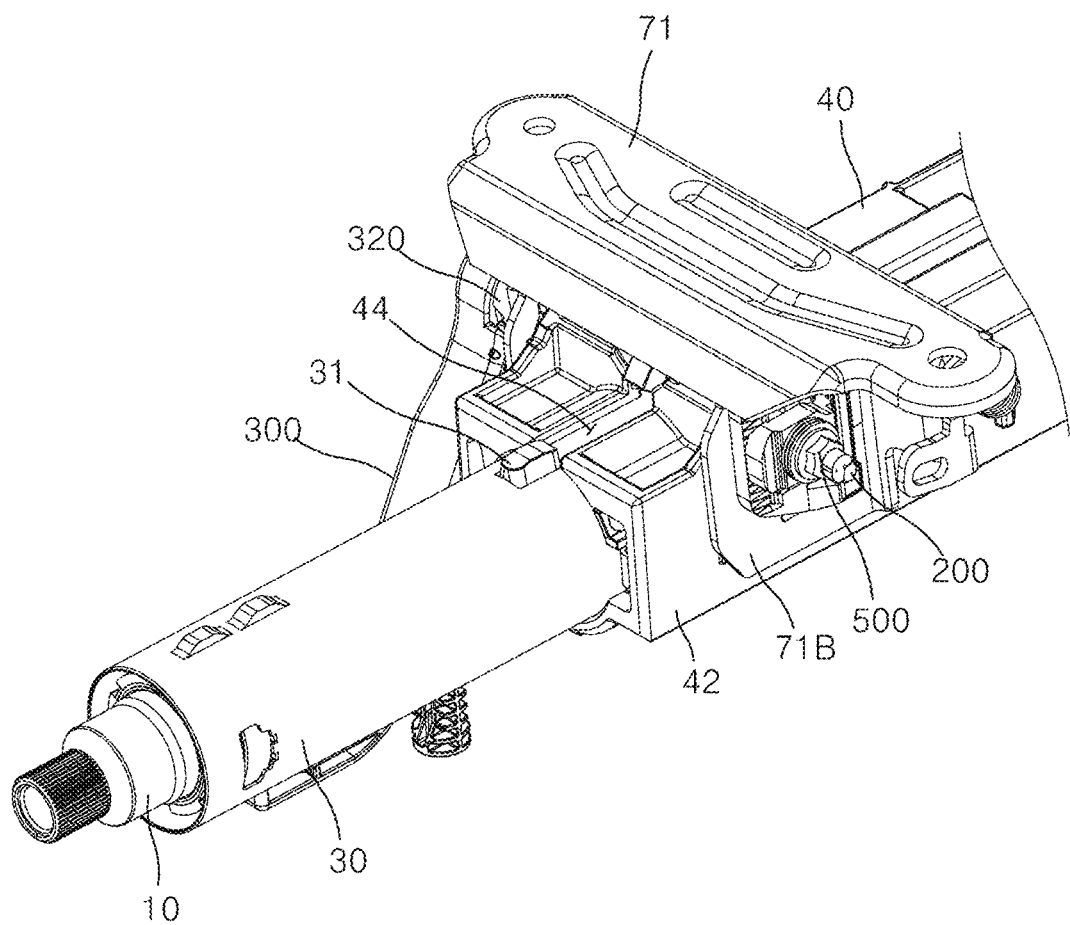
FIG. 2 is the other side partial perspective view illustrating the steering apparatus for a vehicle according to the embodiment of the present invention.

FIG. 2 is the other side partial perspective view illustrating the steering apparatus for a vehicle according to the embodiment of the present invention.

With reference to FIGS. 1 and 2, a pair of installation block parts 41 and 42 may be provided at an upper end of the column housing 40. An outer surface of each of the pair of installation block parts 41 and 42 may include a flat surface. The pair of installation block parts 41 and 42 may be disposed to be opposite to each other in a radial direction of the inner tube 30.

Hereinafter, any one installation block part 41 of the pair of installation block parts 41 and 42, which is disposed to be close to the tilt lever 300, will be referred to as a first installation block part 41, and the other installation block part 42 will be referred to as a second installation block part 42.

The first installation block part 41 may define one side of the column housing 40, and the second installation block part 42 may define the other side of the column housing 40.

A first coupling plate part 71A and a second coupling plate part 71B, which are opposite to each other, may be provided on the first mounting bracket 71. The first coupling plate part 71A may be disposed at one side of the column housing 40, and the second coupling plate part 71B may be disposed at the other side of the column housing 40. That is, the first coupling plate part 71A may be coupled to an outer side of the first installation block part 41, and the second coupling plate part 71B may be coupled to an outer side of the second installation block part 42.

The tilt adjustment device 100 may include a tilt shaft 200, the tilt lever 300, a first tilt cam 320, a second tilt cam 400, and a nut 500.

The tilt shaft 200 may have a predetermined length extending in a direction orthogonal to the longitudinal direction of the steering shaft 10. The tilt shaft 200 may penetrate the first installation block part 41 and the second installation block part 42. That is, the tilt shaft 200 may penetrate two opposite sides of the column housing 40. The tilt shaft 200 may extend straight in the direction orthogonal to the longitudinal direction of the steering shaft 10. The tilt lever 300 may be coupled to one end of the tilt shaft 200, and the nut 500 may be coupled to the other end of the tilt shaft 200.

The tilt lever 300 may be formed in various shapes with predetermined lengths. A handle portion may be formed at one end of the tilt lever 300, and the tilt shaft 200 may be coupled to the other end of the tilt lever 300. The tilt lever 300 may rotate about a rotation center, i.e., a point to which the tilt shaft 200 is coupled.

The first tilt cam 320 may be coupled to an inner surface of the other end of the tilt lever 300. One end of the tilt shaft 200 may penetrate a center of the first tilt cam 320 and be coupled to the other end of the tilt lever 300. A shaft through-hole, which is penetrated by one end of the tilt shaft 200, may be formed at a center of the first tilt cam 320.

The second tilt cam 400 may be installed on an outer surface of the first coupling plate part 71A of the first mounting bracket 71, and the tilt shaft 200 may penetrate a center of the second tilt cam 400. A shaft through-hole, which is penetrated by the tilt shaft 200, may be formed at a center of the second tilt cam 400.

When the user rotates the tilt lever 300 to lock or unlock the tilt lever 300, the tilt shaft 200 may be moved in the longitudinal direction by operating in conjunction with the first tilt cam 320 and the second tilt cam 400.

The tilt shaft 200 may be installed to be movable in the longitudinal direction without rotating relative to the second tilt cam 400. During the rotational operation of the tilt lever 300, the tilt shaft 200 may move in the longitudinal direction of the tilt shaft 200 while rotating together with the tilt lever 300.

Specifically, a plurality of cam protrusions may be formed on a surface of the first tilt cam 320 and a surface of the second tilt cam 400 opposite to each other. The plurality of cam protrusions formed on the first tilt cam 320 and the plurality of cam protrusions formed on the second tilt cam 400 may be spaced apart from one another in the rotation direction of the tilt lever 300.

The plurality of cam protrusions formed on the first tilt cam 320 and the plurality of cam protrusions formed on the second tilt cam 400 may each be formed in a triangular shape. The shapes may be changed to various shapes in addition to the triangular shape.

During the rotational operation of the tilt lever 300, the plurality of cam protrusions formed on the first tilt cam 320 and the plurality of cam protrusions formed on the second tilt cam 400 may rotate together with the tilt lever 300 while being in contact with one another. In this case, the plurality of cam protrusions formed on the first tilt cam 320 moves inward or outward along the plurality of cam protrusions formed on the second tilt cam 400, such that the tilt lever 300 may move in the longitudinal direction of the tilt shaft 200. The tilt lever 300 may be unlocked when the tilt lever 300 moves inward, and the tilt lever 300 may be locked when the tilt lever 300 moves outward.

Meanwhile, the driver may adjust the position of the steering wheel in accordance with the body condition of the driver by moving the inner tube 30 in the longitudinal direction of the steering shaft 10 relative to the column housing 40 in the unlocked state of the tilt lever 300. Thereafter, the driver may lock the tilt lever 300 so that the inner tube 30 does not move in the longitudinal direction of the steering shaft 10 relative to the column housing 40.

In an unlocked position of the tilt lever 300, the inner tube 30 may move in the longitudinal direction of the steering shaft 10 relative to the column housing 40. In addition, in a locked position of the tilt lever 300, the inner tube 30 cannot move in the longitudinal direction of the steering shaft 10 relative to the column housing 40.

That is, in order to switch from the locked state to the unlocked state of the tilt lever 300, the user may grip the handle portion of the tilt lever 300 and rotate the tilt lever 300 in one direction.

Therefore, the first tilt cam 320 may be moved outward by the rotation of the tilt lever 300 in conjunction with the second tilt cam 400. In this case, the inner circumferential surface of the column housing loosely 40 is attached to the outer circumferential surface of the inner tube 30, and the inner tube 30 may move in the longitudinal direction of the steering column 20 relative to the column housing 40, such that the driver may adjust the position of the steering wheel in accordance with the body condition of the driver by moving the inner tube 30 in the longitudinal direction of the steering column 20.

In addition, in order to switch from the unlocked state to the locked state of the tilt lever 300, the driver may grip the handle portion of the tilt lever 300 and rotate the tilt lever 300 in the reverse direction.

Therefore, the first tilt cam 320 may be moved inward by the rotation of the tilt lever 300 in conjunction with the second tilt cam 400. In this case, the inner circumferential surface of the column housing 40 may be tightly attached to the outer circumferential surface of the inner tube 30, which may fix the inner tube 30 so that the inner tube 30 does not move in the longitudinal direction of the steering shaft 10 relative to the column housing 40.

A slot 44 may be formed between the first installation block part 41 and the second installation block part 42 of the column housing 40. The slot 44 may be formed in an outer circumferential surface of the column housing 40 and elongated in the longitudinal direction of the steering shaft 10. The slot 44 may be formed to be opened in the outer circumferential surface of the column housing 40. Because the slot 44 is formed in the outer circumferential surface of the column housing 40, the column housing 40 may be retracted inward in the locked position of the tilt lever 300, such that the inner circumferential surface of the column housing 40 may be tightly attached to the outer circumferential surface of the inner tube 30. In the unlocked position of the tilt lever 300, the column housing 40 is spread outward, such that the inner circumferential surface of the column housing 40 may be loosely attached to the outer circumferential surface of the inner tube 30.

The tilt shaft 200 may be disposed outward of the slot 44 in the state in which the tilt shaft 200 penetrates the two opposite sides of the column housing 40. A part of the inner tube 30 may be disposed inward of the slot 44 in the state in which the inner tube 30 is inserted into the column housing 40.

Meanwhile, the steering apparatus 1 for a vehicle according to the embodiment of the present invention may move the inner tube 30 in the longitudinal direction of the steering shaft 10 relative to the column housing 40 in case that an external impact is applied by a collision accident of the vehicle in the locked position of the tilt lever 300, thereby preventing the driver from colliding with the steering wheel and being severely injured. Further, the steering apparatus 1 for a vehicle according to the embodiment of the present invention may prevent the inner tube 30 from further moving in the longitudinal direction of the steering shaft 10 at a particular position when the inner tube 30 is moved by the weight thereof in the longitudinal direction of the steering shaft 10 relative to the column housing 40 in the unlocked position of the tilt lever 300, such that the driver may easily adjust the position of the inner tube 30.

To this end, a stopper 31 may protrude from the outer circumferential surface of the inner tube 30. When the inner tube 30 moves in the longitudinal direction of the steering shaft 10, the stopper 31 may move in the slot 44 in the longitudinal direction of the steering shaft 10.

The stopper 31 may protrude to the outside of the inner tube 30 from the inside of the inner tube 30 through a hole formed in the outer circumferential surface of the inner tube 30. However, the stopper 31 may protrude directly from the outer circumferential surface of the inner tube 30.

The stopper 31 may move along the slot 44 when the inner tube 30 is moved in the axial direction by an external impact in the locked position of the tilt lever 300. Therefore, in case that an external impact is applied by a collision accident of the vehicle, the inner tube 30 accurately moves in the longitudinal direction of the slot 44 without rotating in the circumferential direction, which may prevent the driver from colliding with the steering wheel and being severely injured.

When the inner tube 30 is moved in the axial direction by the weight thereof in the unlocked position of the tilt lever 300, the stopper 31 may come into contact with a stopper protrusion (not illustrated) installed on the tilt shaft 200 and restrict the movement of the inner tube 30 in the axial direction. Therefore, in case that the driver places the tilt lever 300 in the unlocked position to adjust the position of the steering wheel in accordance with the body condition of the driver, it is possible to prevent the inner tube 30 from being moved in the axial direction by the weight thereof, such that the driver may easily adjust the position of the steering wheel.

In the locked state of the tilt lever 300, the stopper protrusion may be disposed at a position at which the stopper 31 is not caught even though the inner tube 30 moves in the longitudinal direction of the steering shaft 10. Therefore, when an external impact is applied in the event of a vehicle collision in the locked state of the tilt lever 300, the inner tube 30 may be moved in the longitudinal direction of the steering shaft 10 relative to the column housing 40 by the external impact.

In the unlocked state of the tilt lever 300, the stopper protrusion may be disposed at a position at which the stopper 31 is caught in case that the inner tube 30 moves in the longitudinal direction of the steering shaft 10. Therefore, when the driver places the tilt lever 300 in the unlocked position to adjust the position of the steering wheel in accordance with the body condition of the driver, the inner tube 30 is moved in the longitudinal direction of the steering shaft 10 relative to the column housing 40 by the weight thereof. Therefore, the stopper 31 is moved in the longitudinal direction of the steering shaft 10 along the slot 44 and then caught by the stopper protrusion. Therefore, because the inner tube 30 is not moved any further in the longitudinal direction of the steering shaft 10 by the weight thereof, the driver may adjust the position of the steering wheel in accordance with the body condition of the driver by easily moving the inner tube 30 in the longitudinal direction of the steering shaft 10.

Figure 3:
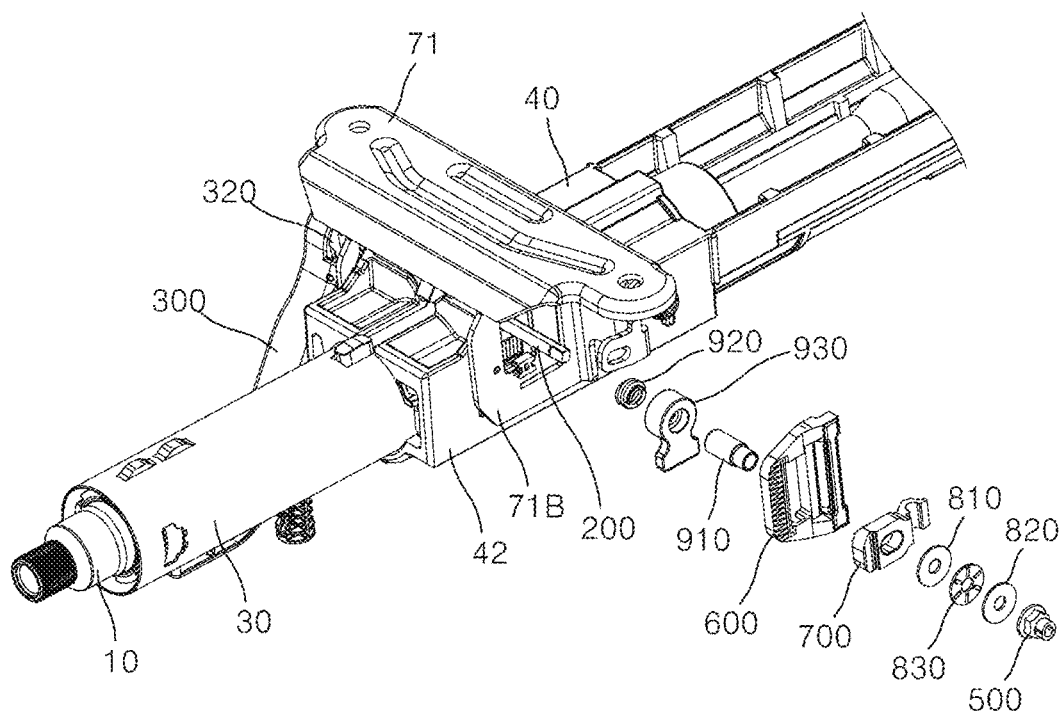
FIG. 3 is an exploded perspective view illustrating a main configuration of the steering apparatus for a vehicle illustrated in FIG. 2.
Figure 4:
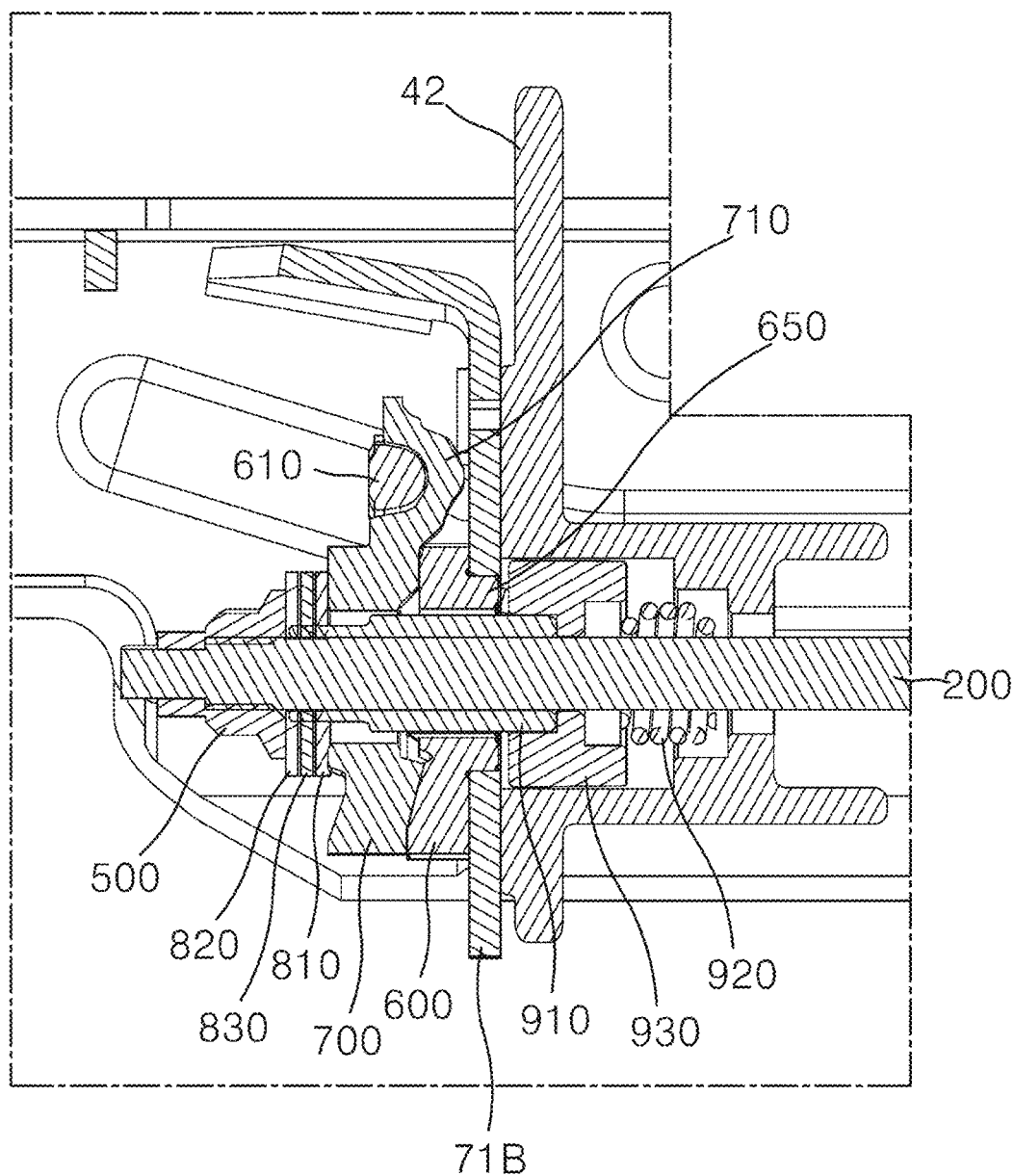
FIG. 4 is a transverse cross-sectional view illustrating a portion of the steering apparatus for a vehicle according to the embodiment of the present invention where a tilt adjustment device is installed, i.e., a view illustrating a state in which a moving gear engages with a fixed gear in a locked state of a tilt lever.
Figure 5:
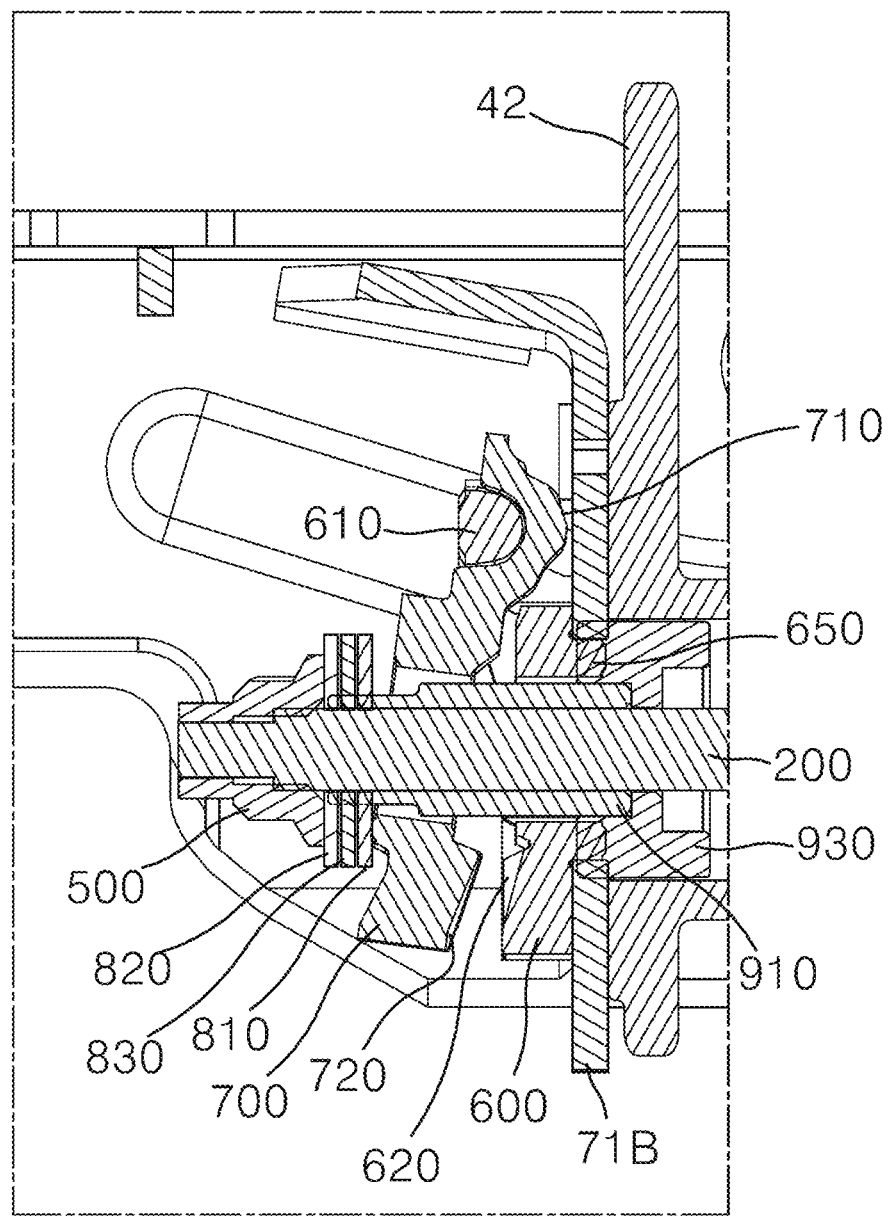
FIG. 5 is a transverse cross-sectional view illustrating the portion of the steering apparatus for a vehicle according to the embodiment of the present invention where the tilt adjustment device is installed, i.e., a view illustrating a state in which the moving gear disengages from the fixed gear in an unlocked state of the tilt lever.

FIG. 3 is an exploded perspective view illustrating a main configuration of the steering apparatus for a vehicle illustrated in FIG. 2, FIG. 4 is a transverse cross-sectional view illustrating a portion of the steering apparatus for a vehicle according to the embodiment of the present invention where the tilt adjustment device is installed, i.e., a view illustrating a state in which a moving gear engages with a fixed gear in the locked state of the tilt lever, and FIG. 5 is a transverse cross-sectional view illustrating the portion of the steering apparatus for a vehicle according to the embodiment of the present invention where the tilt adjustment device is installed, i.e., a view illustrating a state in which the moving gear disengages from the fixed gear in the unlocked state of the tilt lever.

With reference to FIGS. 3 to 5, the tilt adjustment device 100 may further include a fixed gear 600, a moving gear 700, a first washer 810, a second washer 820, a needle roller cage 830, a bushing tube 910, an elastic member 920, and a movement block 930.

The tilt shaft 200 may sequentially penetrate the first coupling plate part 71A, the two opposite sides of the column housing 40, and the second coupling plate part 71B.

One end of the bushing tube 910 may penetrate the fixed gear 600, the moving gear 700, the first washer 810, and the needle roller cage 830 and be inserted into the second washer 820. The fixed gear 600, the moving gear 700, the first washer 810, and the needle roller cage 830 may have holes penetrated by one end of the bushing tube 910, and the second washer 820 may have a hole into which one end of the bushing tube 910 is inserted.

Further, one end of the tilt shaft 200 may penetrate the first tilt cam 320 and be coupled to the tilt lever 300, and the remaining part of the tilt shaft 200 may penetrate the second tilt cam 400, the first coupling plate part 71A, the first installation block part 41, the elastic member 920, the movement block 930, the second installation block part 42, the second coupling plate part 71B, the bushing tube 910, the second washer 820, and the nut 500. The second tilt cam 400, the first coupling plate part 71A, the first installation block part 41, the elastic member 920, the movement block 930, the second installation block part 42, the second coupling plate part 71B, the bushing tube 910, the second washer 820, and the nut 500 may have holes penetrated by the tilt shaft 200.

The nut 500 may be coupled to the other end of the tilt shaft 200 by caulking and fix the tilt adjustment device 100 so that the tilt adjustment device 100 is not separated from the first installation block part 41 and the second installation block part 42 of the column housing 40.

The fixed gear 600 may be fixedly installed at one side of the two opposite sides of the column housing 40 that is disposed to be distant from the tilt lever 300. That is, the fixed gear 600 may be fixedly installed on the second installation block part 42 of the column housing 40. In the present embodiment, the first coupling plate part 71A may be disposed on the outer surface of the first installation block part 41, and the second coupling plate part 71B may be disposed on the outer surface of the second installation block part 42, such that the fixed gear 600 may be fixedly installed on the outer surface of the second coupling plate part 71B, and the moving gear 700 may be rotatably coupled to the fixed gear 600.

The moving gear 700 may engage with the fixed gear 600 in the locked state of the tilt lever 300, and the moving gear 700 may disengage from the fixed gear 600 in the unlocked state of the tilt lever 300.

The first washer 810 may be disposed between the moving gear 700 and the nut 500. The first washer 810 may be disposed between the moving gear 700 and the second washer 820. The first washer 810 may be disposed between the moving gear 700 and the needle roller cage 830. The first washer 810 may be in contact with the moving gear 700.

The second washer 820 may be disposed between the first washer 810 and the nut 500. The second washer 820 may be disposed between the moving gear 700 and the nut 500. The second washer 820 may be disposed between the needle roller cage 830 and the nut 500. The second washer 820 may be in contact with the nut 500.

The needle roller cage 830 may be disposed between the first washer 810 and the second washer 820. The needle roller cage 830 may be disposed between the moving gear 700 and the nut 500. The needle roller cage 830 may be disposed between the first washer 810 and the nut 500. The needle roller cage 830 may be disposed between the moving gear 700 and the second washer 820. The two opposite surfaces of the needle roller cage 830 may be respectively in contact with the first washer 810 and the second washer 820. The needle roller cage 830 may be formed in a material having an elastic force. In the present embodiment, the needle roller cage 830 may be made of a rubber material.

One end of the bushing tube 910 may penetrate the fixed gear 600 and support the moving gear 700 in a direction in which the moving gear 700 disengages from the fixed gear 600. One end of the bushing tube 910 may have a smaller outer diameter than the other end of the bushing tube 910. Therefore, an outer surface of the bushing tube 910 may have a stepped portion formed between one end of the bushing tube 910 and the other end of the bushing tube 910. The bushing tube 910 may be caught by the moving gear 700 in the moving gear 700 and support the moving gear 700 in the direction in which the moving gear 700 disengages from the fixed gear 600.

The elastic member 920 may have an elastic force that may disengage the moving gear 700 from the fixed gear 600 in the unlocked state of tilt lever 300. The elastic member 920 may be formed as a coil spring. However, the elastic member 920 need not be necessarily formed as a coil spring. The elastic member 920 may include any member having an elastic force that may disengage the moving gear 700 from the fixed gear 600 in the unlocked state of the tilt lever 300.

The other end of the bushing tube 910 may be seated at one side of the movement block 930. One end of the elastic member 920 may be seated at the other side of the movement block 930. The movement block 930 may move the bushing tube 910 by the elastic force of the elastic member 920 in the direction in which the moving gear 700 disengages from the fixed gear 600. That is, when the bushing tube 910 is moved by the elastic force of the elastic member 920, the moving gear 700 may disengage from the fixed gear 600 while being rotated by the bushing tube 910.

The elastic member 920 and the movement block 930 may be disposed inside the column housing 40, one end of the bushing tube 910 may be disposed outside the column housing 40, and the other end of the bushing tube 910 may be disposed inside the column housing 40.

Figure 6:
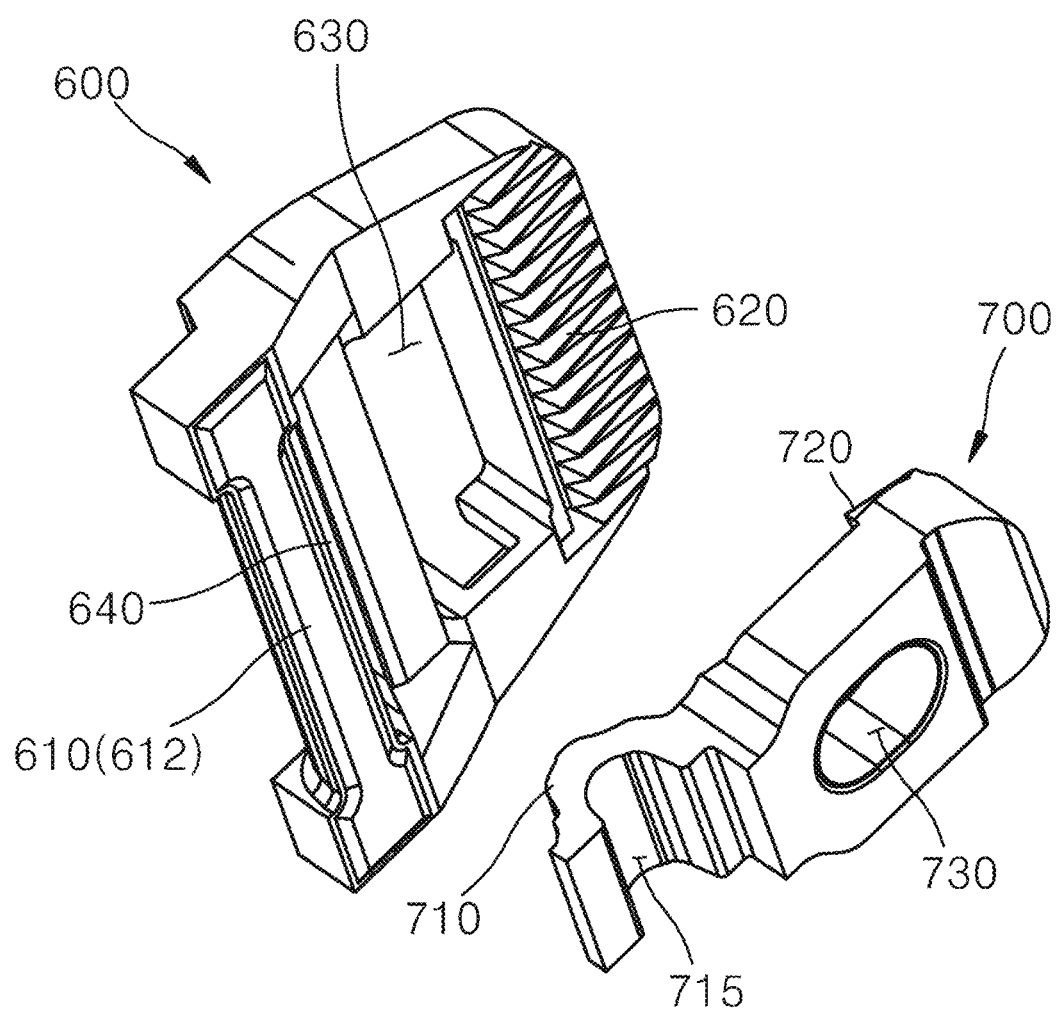
FIG. 6 is one side perspective view illustrating the fixed gear and the moving gear illustrated in FIG. 3.
Figure 7:
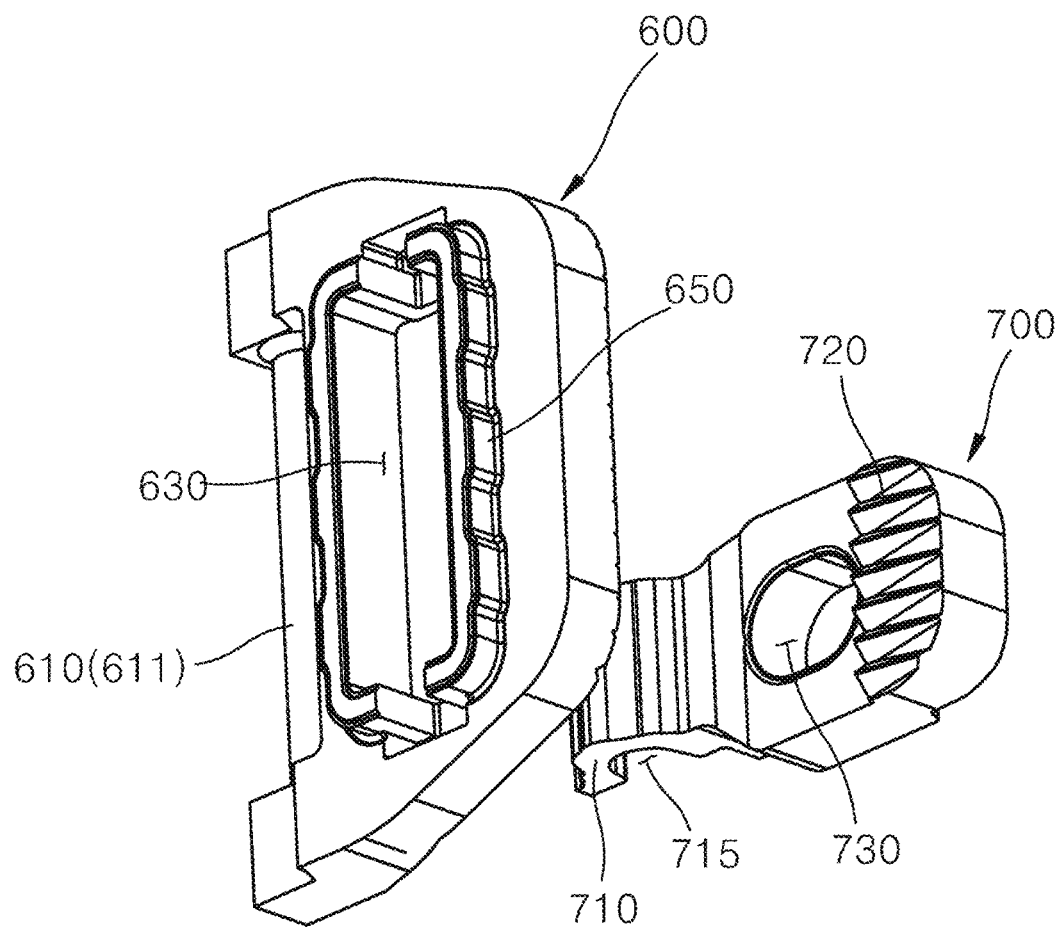
FIG. 7 is the other side perspective view illustrating the fixed gear and the moving gear illustrated in FIG. 3.
Figure 8:
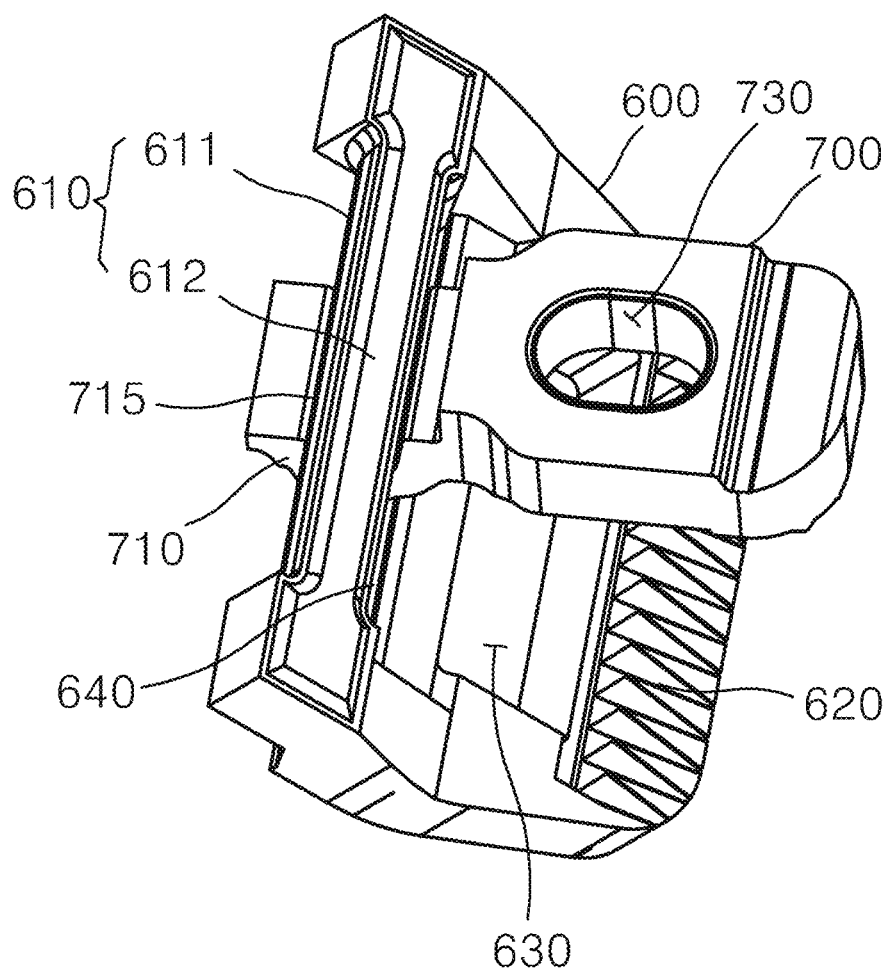
FIG. 8 is one side perspective view illustrating a coupled state of the fixed gear and the moving gear illustrated in FIGS. 6 and 7.
Figure 9:
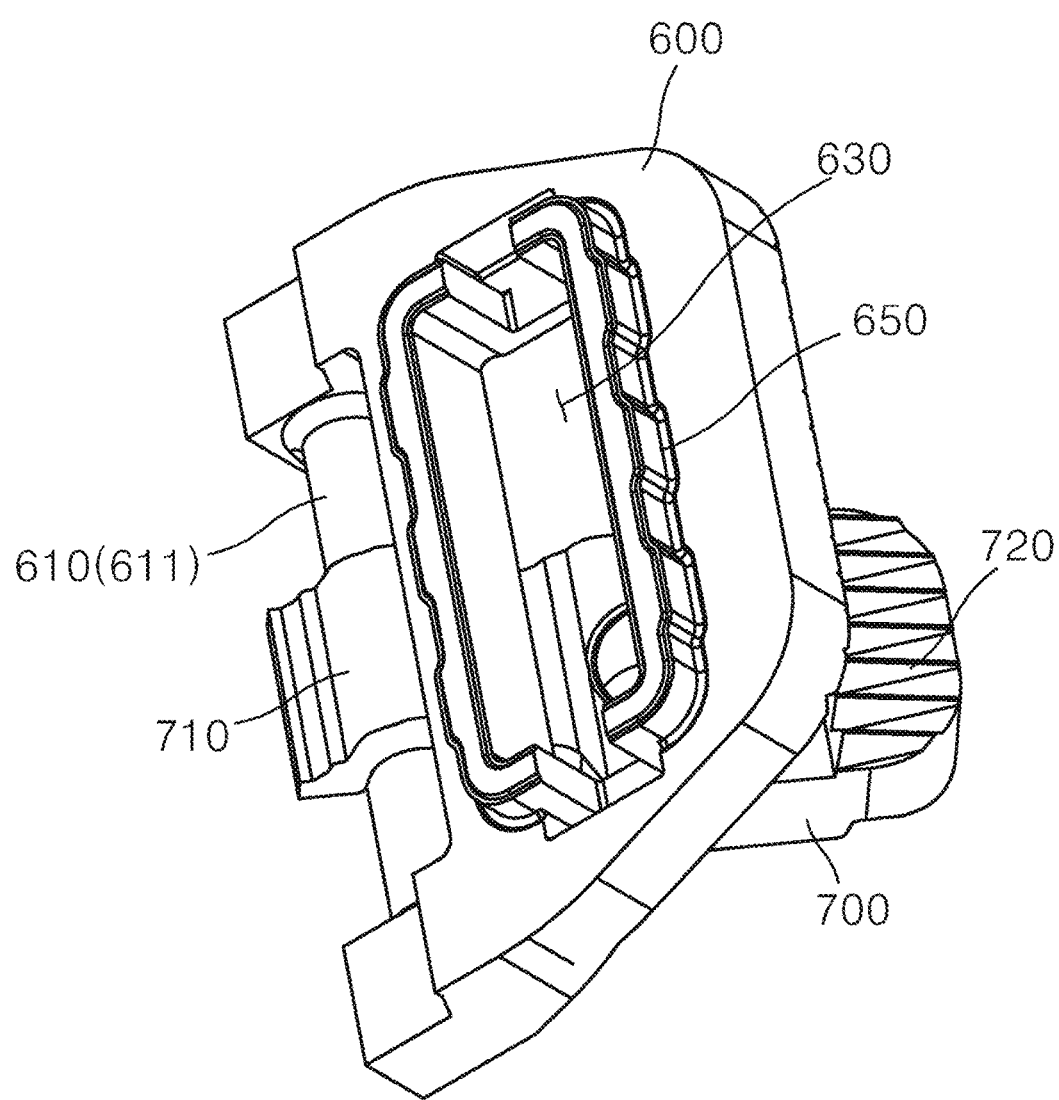
FIG. 9 is the other side perspective view illustrating the coupled state of the fixed gear and the moving gear illustrated in FIGS. 6 and 7.

FIG. 6 is one side perspective view illustrating the fixed gear and the moving gear illustrated in FIG. 3, FIG. 7 is the other side perspective view illustrating the fixed gear and the moving gear illustrated in FIG. 3, FIG. 8 is one side perspective view illustrating a coupled state of the fixed gear and the moving gear illustrated in FIGS. 6 and 7, and FIG. 9 is the other side perspective view illustrating the coupled state of the fixed gear and the moving gear illustrated in FIGS. 6 and 7.

With reference to FIGS. 4 to 9, a coupling shaft part 610 may be provided at one end of the fixed gear 600. Two opposite ends of the coupling shaft part 610 of the fixed gear 600 may be integrated with the fixed gear 600, and an intervening portion between the two opposite ends may be disposed so that a separation hole 640 is formed between a body of the fixed gear 600 and the intervening portion.

A plurality of gear teeth 620 may be formed on an outer surface of the fixed gear 600. The plurality of gear teeth 620 may be formed on a surface of the other end of the fixed gear 600 that is opposite to the moving gear 700.

The fixed gear 600 may have a first through-hole 630 formed between one end of the fixed gear 600 and the other end of the fixed gear 600. The other end of the tilt shaft 200 may penetrate the first through-hole 630.

A press-fitting portion 650, which is press-fitted into a hole formed in the second coupling plate part 71B, may protrude from a surface of the fixed gear 600 that is directed toward the second coupling plate part 71B. The press-fitting portion 650 may be formed in a shape that surrounds the first through-hole 630 and formed in a shape in which two opposite ends thereof are opened in a longitudinal direction of the coupling shaft part 610. A plurality of press-fitting protrusions may be formed on a circumferential surface of the press-fitting portion 650 and spaced apart from one another in the circumferential direction. The plurality of press-fitting protrusions may be press-fitted into inner circumferential surfaces of holes formed in the second coupling plate part 71B.

A coupling rotation part 710 may be provided at one end of the moving gear 700 and rotatably coupled to the coupling shaft part 610 of the fixed gear 600. The coupling rotation part 710 of the moving gear 700 may be integrated with the moving gear 700 and caught by and fitted and coupled to the coupling shaft part 610 of the fixed gear 600 through the separation hole 640 formed between the body of the fixed gear 600 and the coupling shaft part 610. The coupling rotation part 710 may be rotatably coupled to the coupling shaft part 610 and movable along a length of the coupling shaft part 610.

A plurality of gear teeth 720 may be formed on an inner surface of the moving gear 700. The plurality of gear teeth 720 may be formed on a surface of the other end of the moving gear 700 that is opposite to the fixed gear 600.

That is, the plurality of gear teeth 620 and 720 may be provided on the surface of the other end of the fixed gear 600 and the surface of the other end of the moving gear 700 that are opposite to each other. In this case, depths and widths of troughs between the plurality of gear teeth 620 formed on the fixed gear 600 may gradually increase toward the coupling shaft part 610. The plurality of gear teeth 720 formed on the moving gear 700 may be shaped to engage with the troughs between the plurality of gear teeth 620 formed on the fixed gear 600. Therefore, it is possible to improve an engagement force between the fixed gear 600 and the moving gear 700.

The moving gear 700 may have a second through-hole 730 formed between one end of the moving gear 700 and the other end of the moving gear 700. The other end of the tilt shaft 200 may penetrate the second through-hole 730.

The first through-hole 630 of the fixed gear 600, which is penetrated by the tilt shaft 200, may be elongated in the tilt adjustment direction and enable the tilt adjustment. The second through-hole 730 of the moving gear 700 may be formed in an elliptical shape elongated in a direction orthogonal to a longitudinal direction of the first through-hole 630 of the fixed gear 600. A length of the first through-hole 630 may be longer than a length of the second through-hole 730. A length of the second through-hole 730 may be shorter than a length of the first through-hole 630.

The moving gear 700 may be rotated about the coupling shaft part 610 as a rotation center by the longitudinal movement of the tilt shaft 200 during the rotational operation of the tilt lever 300, such that the moving gear 700 may engage with or disengage from the fixed gear 600. In this case, the configuration in which the moving gear 700 engages with the fixed gear 600 may mean a configuration in which the plurality of gear teeth 720 formed on the inner surface of the moving gear 700 and the plurality of gear teeth 620 formed on the outer surface of the fixed gear 600 engage with one another.

That is, when the moving gear 700 rotates about the coupling shaft part 610 as a rotation center toward the fixed gear 600, the plurality of gear teeth 720 formed on the inner surface of the moving gear 700 engages with the plurality of gear teeth 620 formed on the outer surface of the fixed gear 600, such that the tilt lever 300 may be in the locked state.

In addition, in the unlocked state of the tilt lever 300, the moving gear 700 rotates about the coupling shaft part 610 as a rotation center away from the fixed gear 600, and the plurality of gear teeth 720 formed on the inner surface of the moving gear 700 is separated from the plurality of gear teeth 620 formed on the outer surface of the fixed gear 600, such that the tilt lever 300 may be in the unlocked state.

The fixed gear 600 and the moving gear 700 may be formed by sintering. Of course, only the fixed gear 600 may be formed by sintering, and the moving gear 700 may be formed by sintering. That is, at least one of the fixed gear 600 and the moving gear 700 may be formed by sintering.

When the fixed gear 600 is formed by sintering, the coupling shaft part 610 may be integrated with the fixed gear 600 by being formed by sintering together with the fixed gear 600. In addition, when the moving gear 700 is formed by sintering, the coupling rotation part 710 may be integrated with the moving gear 700 by being formed by sintering together with the moving gear 700.

Because the fixed gear 600 and the coupling shaft part 610 are integrated by being formed together by sintering, the coupling strength between the fixed gear 600 and the coupling shaft part 610 is high, and deformation caused by an external axial force may be prevented, in comparison with a case in which the fixed gear 600 and the coupling shaft part 610 are separately formed by die casting and the fixed gear 600 and the coupling shaft part 610 are provided as separate components.

In addition, because the fixed gear 600 and the moving gear 700 are formed by sintering, the fixed gear 600 and the moving gear 700 have high hardness, which may advantageously maintain the shapes of the plurality of gear teeth 620 and 720 in comparison with a case in which the fixed gear 600 and the moving gear 700 are formed by die casting.

A side of the coupling rotation part 710 of the moving gear 700, which is opposite to the surface of the moving gear 700 on which the plurality of gear teeth 720 is formed, may have an opening 715. The coupling rotation part 710 may be rotatably coupled to the coupling shaft part 610 through the opening 715. The coupling rotation part 710 of the moving gear 700 may be easily coupled to the coupling shaft part 610 of the fixed gear 600 through the opening 715.

The coupling shaft part 610 of the fixed gear 600 may include a curved portion 611 and a planar portion 612. The curved portion 611 may be formed as a curved surface corresponding to an inner circumferential surface of the coupling rotation part 710 and provided to be in contact with the inner circumferential surface of the coupling rotation part 710. The planar portion 612 may be formed at a side opposite to the curved portion 611. The planar portion 612 may be formed in a shape protruding from the side opposite to the curved portion 611. The planar portion 612 may be opposite to the opening 715 in the state in which the moving gear 700 engages with the fixed gear 600. In this case, the curved portion 611 may be formed by configuring a section in which the moving gear 700 rotates to the curved portion 611, such that the moving gear 700 may smoothly rotate by means of the curved portion 611. In addition, the planar portion 612 may be formed by configuring a section in which the moving gear 700 does not rotate to the planar portion 612. The planar portion 612 may reduce the weight of the coupling shaft part 610 and make it easy to manufacture the coupling shaft part 610 by sintering.

As described above, according to the steering apparatus 1 for a vehicle according to the embodiment of the present invention, at least one of the fixed gear 600 and the moving gear 700 is formed by sintering, which may improve strength and hardness of at least one of the fixed gear 600 and the moving gear 700.

In addition, according to the steering apparatus 1 for a vehicle according to the embodiment of the present invention, the coupling shaft part 610, which is provided on the fixed gear 600 so that the moving gear 700 is rotatably coupled to the coupling shaft part 610, is formed by sintering together with the fixed gear 600 when the fixed gear 600 is formed, such that the coupling shaft part 610 is integrated with the fixed gear 600, which may improve the coupling strength between the fixed gear 600 and the coupling shaft part 610 and prevent deformation caused by an external axial force.

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims to be described below rather than the detailed description, and it should be interpreted that the meaning and scope of the claims and all the changes or modified forms derived from the equivalent concepts thereto fall within the scope of the present invention.

INDUSTRIAL APPLICABILITY

The present invention provides the steering apparatus for a vehicle, in which strength and hardness of at least one of the fixed gear and the moving gear, which constitute the tilt adjustment device, are improved.

The invention claimed is:

1. A steering apparatus for a vehicle, the steering apparatus comprising:
   a tilt shaft configured to penetrate two opposite sides of a column housing and having one end to which a tilt lever is coupled;
   a fixed gear fixed to one side of the two opposite sides of the column housing that is disposed to be distant from the tilt lever, the fixed gear being penetrated by the other end of the tilt shaft and having one end at which a coupling shaft part is formed; and
   a moving gear penetrated by the other end of the tilt shaft and having one end at which a coupling rotation part, which is rotatably coupled to the coupling shaft part and movable along a length of the coupling shaft part, is formed, the moving gear being configured to engage with or disengage from the fixed gear by being rotated about the coupling shaft part as a rotation center by a movement of the tilt shaft in an axial direction during a rotational operation of the tilt lever,
   wherein two opposite ends of the coupling shaft part of the fixed gear are integrated with the fixed gear,
   wherein an intervening portion between the two opposite ends is disposed so that a separation hole is formed between a body of the fixed gear and the intervening portion,
   wherein the coupling rotation part of the moving gear is integrated with the moving gear and caught by and fitted and coupled to the coupling shaft part through the separation hole,
   wherein a plurality of gear teeth is formed on a surface of the other end of the fixed gear and a surface of the other end of the moving gear that are opposite to each other,
      wherein a side of the coupling rotation part, which is opposite to the surface of the moving gear on which the plurality of gear teeth is formed, has an opening, and
      wherein the coupling rotation part is rotatably coupled to the coupling shaft part through the opening, and
   wherein the coupling shaft part comprises:
      a curved portion formed as a curved surface corresponding to an inner circumferential surface of the coupling rotation part and provided to be in contact with the inner circumferential surface of the coupling rotation part; and
      a planar portion formed opposite to the curved portion and directed toward the opening in a way in which the moving gear engages with the fixed gear.

2. The steering apparatus of claim 1, wherein the fixed gear is formed by sintering, and
   wherein the coupling shaft part is integrated with the fixed gear by being formed by sintering together with the fixed gear when the fixed gear is formed by sintering.

3. The steering apparatus of claim 1, wherein the moving gear is formed by sintering, and
   wherein the coupling rotation part is integrated with the moving gear by being formed by sintering together with the moving gear when the moving gear is formed by sintering.

4. The steering apparatus of claim 1, wherein depths and widths of troughs between the plurality of gear teeth formed on the fixed gear gradually increase toward the coupling shaft part, and
   wherein the plurality of gear teeth formed on the moving gear is shaped to engage with the troughs between the plurality of gear teeth formed on the fixed gear.

5. The steering apparatus of claim 1, wherein a first installation block part, which has an outer surface formed as a flat surface, is formed at one side of the column housing,
   wherein a second installation block part, which has an outer surface formed as a flat surface, is formed at the other side of the column housing, and
   wherein the tilt shaft penetrates the first installation block part and the second installation block part.

6. The steering apparatus of claim 5, further comprising:
   a mounting bracket comprising a first coupling plate part disposed on an outer surface of the first installation block part, and a second coupling plate part disposed on an outer surface of the second installation block part,
   wherein the tilt shaft penetrates the first coupling plate part and the second coupling plate part, and
   wherein the fixed gear is fixedly disposed outside the second coupling plate part.

7. The steering apparatus of claim 1, further comprising:
   a nut coupled to the other end of the tilt shaft;
   a first washer disposed between the moving gear and the nut and provided to be in contact with the moving gear;
   a second washer disposed between the first washer and the nut and provided to be in contact with the nut; and
   a needle roller cage disposed between the first washer and the second washer and having two opposite surfaces respectively provided to be in contact with the first washer and the second washer.

8. A steering apparatus for a vehicle, the steering apparatus comprising:
   a tilt shaft configured to penetrate two opposite sides of a column housing and having one end to which a tilt lever is coupled;
   a fixed gear fixed to one side of the two opposite sides of the column housing that is disposed to be distant from the tilt lever, the fixed gear being penetrated by the other end of the tilt shaft and having one end at which a coupling shaft part is formed; and
   a moving gear penetrated by the other end of the tilt shaft and having one end at which a coupling rotation part, which is rotatably coupled to the coupling shaft part and movable along a length of the coupling shaft part, is formed, the moving gear being configured to engage with or disengage from the fixed gear by being rotated about the coupling shaft part as a rotation center by a movement of the tilt shaft in an axial direction during a rotational operation of the tilt lever,
   wherein two opposite ends of the coupling shaft part of the fixed gear are integrated with the fixed gear, wherein an intervening portion between the two opposite ends is disposed so that a separation hole is formed between a body of the fixed gear and the intervening portion, and wherein the coupling rotation part of the moving gear is integrated with the moving gear and caught by and fitted and coupled to the coupling shaft part through the separation hole, the steering apparatus further comprising:

a bushing tube penetrated by the tilt shaft and having one end penetrating the fixed gear, the bushing tube being configured to support the moving gear in a direction in which the moving gear disengages from the fixed gear;

an elastic member penetrated by the tilt shaft; and a movement block penetrated by the tilt shaft and having one side at which the other end of the bushing tube is seated, and the other side at which one end of the elastic member is seated, the movement block being configured to move the bushing tube by an elastic force of the elastic member in the direction in which the moving gear disengages from the fixed gear.

* * * * *